W. H. ABBOTT.
Toe-Weight for Horses.

No. 167,599.  Patented Sept. 14, 1875.

Witnesses:
Frank H. Jordan
John L. Hussey

Inventor:
William H. Abbott
per
Wm. Henry Clifford
atty

UNITED STATES PATENT OFFICE.

WILLIAM H. ABBOTT, OF FRYEBURG, MAINE.

IMPROVEMENT IN TOE-WEIGHTS FOR HORSES.

Specification forming part of Letters Patent No. 167,599, dated September 14, 1875; application filed July 30, 1875.

*To all whom it may concern:*

Be it known that I, WILLIAM H. ABBOTT, of Fryeburg, in the county of Oxford and State of Maine, have invented certain new and useful Improvements in Toe-Weights for Horses; and I do hereby declare that the following is a full, clear, and exact description thereof, which will enable others skilled in the art to which it pertains to make and use the same, reference being had to the accompanying drawings and to the letters of reference marked thereon, which form a part of this specification.

Figure 1:
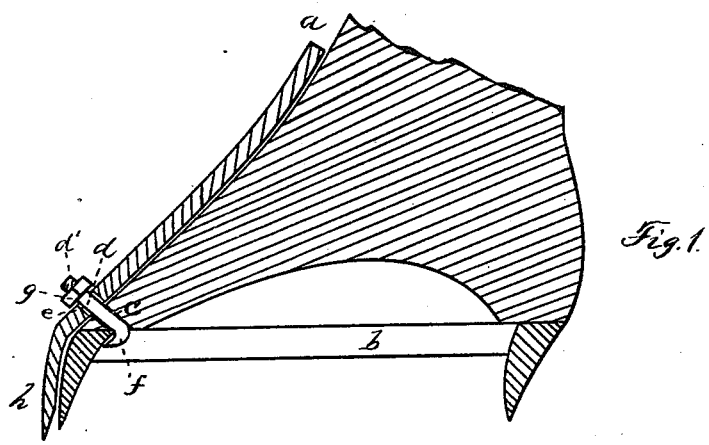
Figure 2:
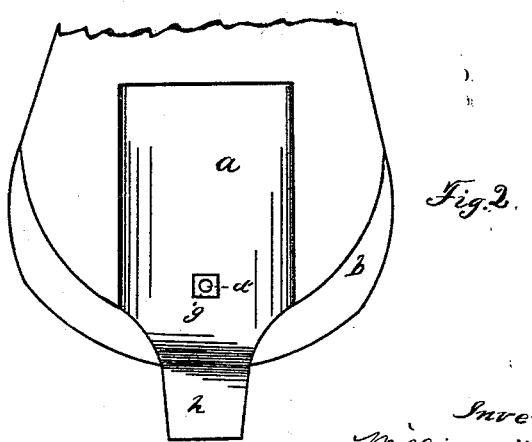

Figure 1 is a side view in section of a horse's hoof with my improvement attached thereto. Fig. 2 is a front view of a horse's hoof with my improvement in place.

Same letters show like parts.

The object of my invention is to produce an improved toe-weight for horses. It is simple, and may be thus described:

$a$ shows my improved weight. It is concave on the inner side so as to fit the front of the hoof. It is secured to the foot in the following manner: $b$ represents the shoe; $c$, a slot cut either in the hoof, as shown, or in the upper surface of the shoe itself. $d$ is a hooked arm, which secures the weight to the hoof by being first placed within the frog of the foot, and the end $d'$ passed through the slot $c$ and through a slot, $e$, in the weight, so that the hook $f$ of the arm $d$ shall hook under the inner edge of the shoe $b$, as shown. A nut, $g$, is then applied to the end $d'$ of the hooked arm, which end is threaded and screwed up so as to hold the weight securely to the hoof of the animal. The lower part of the weight has a projecting piece, $h$, which forms a toe-calk for the horse.

It is evident that any desired weight can be given to the device when manufactured, and that by its use the employment of straps and buckles, as in the ordinary toe-weights, is entirely dispensed with. It is simple of construction, cheap, effective, and capable of easy and secure attachment to the hoof of the animal.

What I claim as my invention, and desire to secure by Letters Patent, is—

The improved toe-weight herein described, consisting essentially of the part $a$, concaved to fit the hoof, having the slot $e$ and toe-calk $h$, in combination with the arm $d$, having the hook $f$ and the nut $g$, as and for the purposes set forth.

In testimony that I claim the foregoing as my own I affix my signature in presence of two witnesses.

W. H. ABBOTT.

Witnesses:
    GEO. B. BARROWS,
    JOHN J. BRADLEY.